United States Patent Office 3,490,836
Patented Jan. 20, 1970

3,490,836
MOTION PICTURE CAMERA WITH EXPOSURE CONTROL DEVICE
Gerhard Borner, Musberg, Wurttemberg, and Josef Schwahn, Stuttgart, Germany, assignors to Zeiss Ikon Aktiengesellschaft, Stuttgart, Germany, a corporation of Germany
Filed Nov. 27, 1967, Ser. No. 685,740
Claims priority, application Germany, Dec. 3, 1966, Z 12,557
Int. Cl. G03b 7/08, 21/36, 21/48
U.S. Cl. 352—141       9 Claims

ABSTRACT OF THE DISCLOSURE

A motion picture camera with a photoelectric exposure control device and a picture frequency selector. The photoelectric exposure control device includes a photoelectrically controlled motor which by means of gear means adjusts a diaphragm-adjusting member. The same gear means is operatively connected with a camera release member and with the picture frequency selector so that in accordance with the selected picture frequency a corresponding adjustment of the diaphragm-adjusting member takes place which in addition thereto, is also adjusted by the photo-electrically controlled motor.

---

Figure 1:
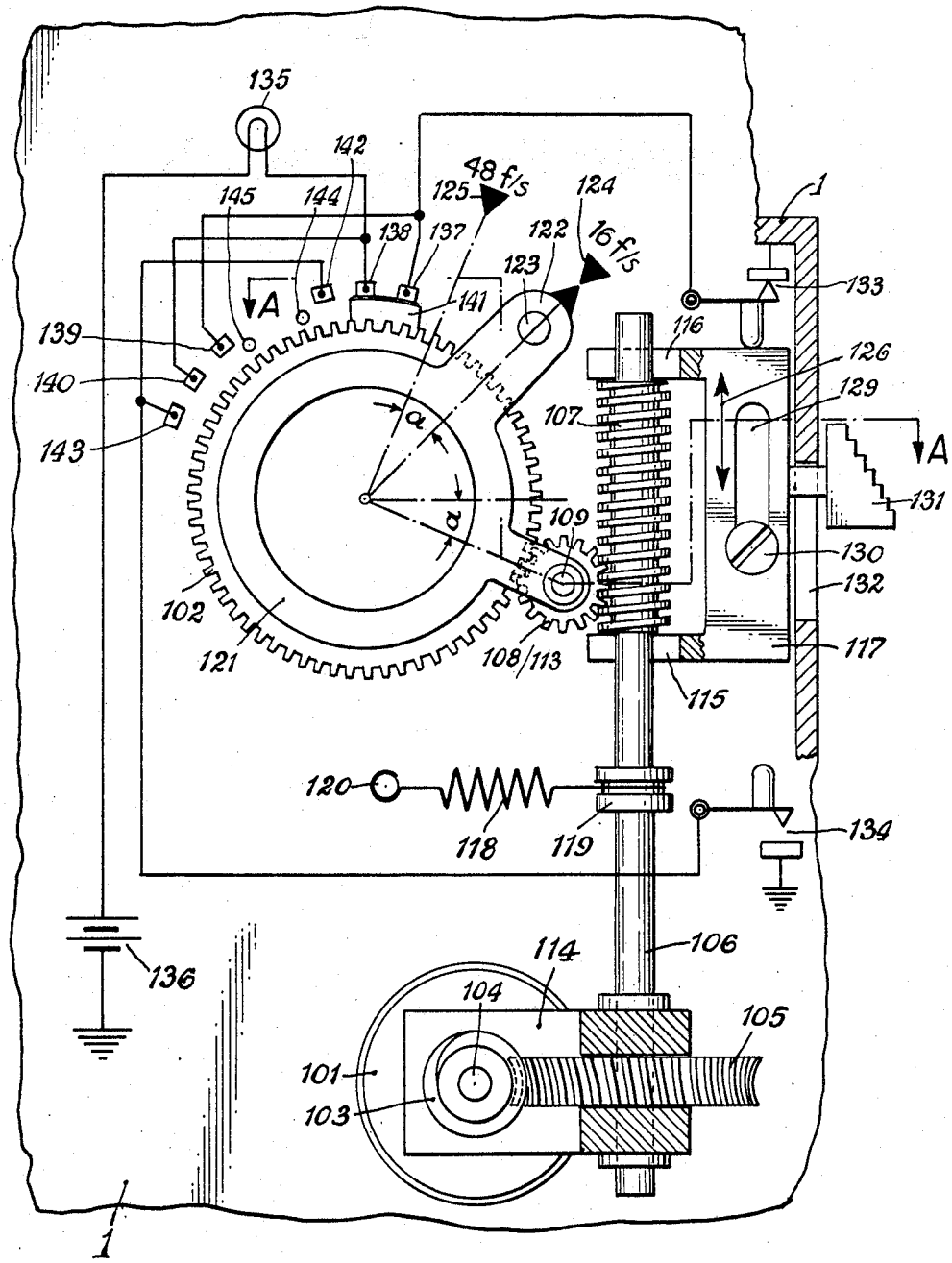

The invention relates to a motion picture camera provided with an exposure control device which cooperates with the picture window shutter. Such a camera has been disclosed in the copending U.S. application Ser. No. 499,216 filed Oct. 21, 1965, and now Patent No. 3,419,326. In this prior camera, a picture frequency selector, which is adjustable during operation, is coupled with a structural element of the control circuit for a diaphragm-adjusting motor, which element registers the exposure value correction for a picture frequency change, and with a member of the reducing gearing linking the diaphragm-adjustment motor and the objective diaphragm. This latter member, while remaining in engagement with its adjacent gearing members, is in addition to the motion serving to transfer the adjustment motion of the diaphragm-adjusting motor, capable of performing another motion by which the movement for a quick diaphragm adjustment to the new picture frequency is superimposed upon the movement effected by the diaphragm-adjusting motor for controlling the diaphragm.

It is the object of the invention to develop further the device for an immediate adjustment of the aperture of a motor controlled diaphragm, preferably an iris diaphragm, to the different light conditions when a different picture frequency is selected, as is disclosed in the mentioned U.S. application Ser. No. 499,216, so that in conformity with the inventive concept, a quick diaphragm readjustment is obtained, especially also in the case when the camera is changed from its stop position to its running position. Such quick diaphragm adjustment becomes necessary when in so-called internally measuring cameras, the picture gate shutter is included in the exposure control device.

This object is accomplished in accordance with the invention in that as a picture frequency selector for a camera of the type mentioned is used, the camera release means which changes the camera from stop position to moving position, adjusts the diaphragm and by changing the illumination of the photoelectric converter from continuous light in the stopped position of the camera to intermittent light in the running camera and vice versa, influences the exposure control device.

In accordance with another object of the invention, the camera release means is additionally so constructed as to adjust the various rates of picture frequency. This means that the camera release is capable not only of turning the motion picture camera on and off, but also of changing the different rates of picture frequency, e.g., 16 frames per second or 48 frames/sec., in the operative condition of the camera. With each change of picture frequency is effected the immediate diaphragm adjustment and the corresponding correction in the exposure control circuit.

According to a still further object of the invention, the camera release means influencing the diaphragm and the exposure control device can also be combined with a second picture frequency selector of the type disclosed in the above mentioned copending U.S. application Ser. No. 499,216. Thereby it is made possible to preselect a certain frame frequency, such as 16 or 48 frames/sec.

If a motion picture camera equipped in the described manner is to be provided with means for indicating the exposure setting, a further development of the inventive concept proposes to connect the means carrying the diaphragm scale or its reference index with the camera release means for the purpose of displacing the same about the difference in the diaphragm aperture values between the diaphragm adjustments for a moving and a stopped picture window shutter.

If a motion picture camera of the type just described is provided with means for indicating the diaphragm adjustment range limits, then according to the invention the means cooperating with a member which moves along with the diaphragm adjustment and signalling the adjustment range limits or controlling such signal, respectively, is connected with the camera release means for the purpose of displacing the same about the difference in the diaphragm aperture values between the diaphragm adjustments for a moving and a stopped picture window shutter.

This means connected to the camera release means can be a carrier of two contacts, of which one at a time is closed so as to cause by electrical means a signal to appear, for instance in the viewfinder, when the member moved by the diaphragm adjustment reaches the diaphragm-adjustment limits.

The diaphragm-adjustment limits may also be indicated according to the invention by providing two mutually offset contact pairs associated with a contactor which is moved together with the diaphragm-adjustment. For the purpose of indicating the diaphragm-adjustment limits, one of the contact pairs is included in a signal circuit for the inoperative position of the camera release means and the other contact pair for the operative position of the camera release means, whereby the amount of the mutual offsetting of the contact pairs corresponds to a displacement of the contactor moving together with the diaphragm adjustment which equals the difference in the diaphragm aperture values between the diaphragm adjustments for a moving and a stopped picture window shutter.

In modern cameras having an objective diaphragm that is capable of being adjusted to very small apertures, such as for instance $f{:}45$, without harmful diffractions, the device according to the invention may be simplified. In such case, all that is needed according to the invention is merely to move the range limit signal associated with the largest diaphragm aperture possible for a stationary picture gate shutter toward the smaller diaphragm aperture by an amount which equals the difference between these two diaphragm aperture values, i.e., at a closing time:opening time of $1{:}1 =$ aperture 1.

For the purpose of an accurate signalling of both range limits in connection with a moving and a stopped picture gate shutter, the contactor being moved by a diaphragm adjustment may according to the invention be constructed or connected with the diaphragm in such manner that upon setting the diaphragm to the smallest possible aperture, the contactor is able to perform an overstroke amounting to at least the difference in the diaphragm aperture values between the diaphragm adjustments for a moving and a stopped picture window shutter, and thereby leaving the diaphragm aperture unchanged.

To this end, the invention proposes to construct the diaphragm-adjusting ring of an iris diaphragm in such manner as to function as a contactor, and to arrange the control slots in the diaphragm leaves at their ends associated with the smallest diaphragm aperture in such manner that by means of an intermediate part which compensates for the difference in the diaphragm aperture values between the diaphragm adjustments for a moving and a stopped picture gate shutter, they are concentric to the axis of rotation (optical axis) of the diaphragm-adjusting ring.

These and other objects of the invention will now be described in detail in an embodiment by way of example and with reference to the accompanying drawings, wherein details not essential to the invention are omitted for the sake of clearly illustrating the real invention.

Figure 2:
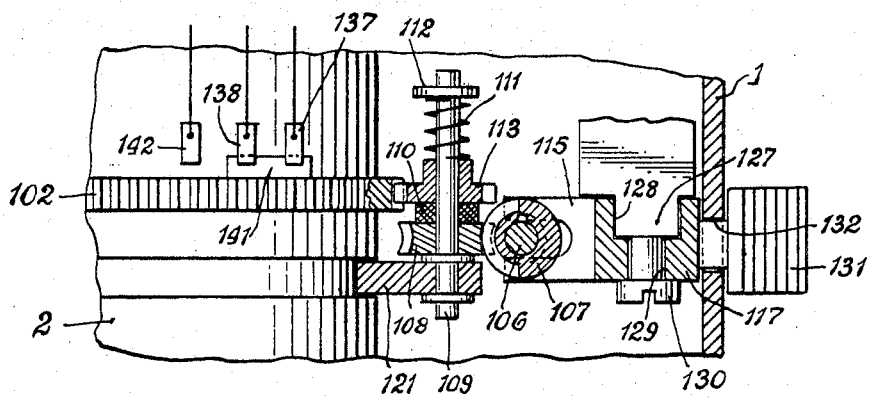

In the drawings:

FIG. 1 is a partial diagrammatic front view of a motion picture camera provided with the device according to the invention, and FIG. 2 is a horizontal sectional view along the line A—A of FIG. 1.

Referring to the drawing, a diaphragm-adjusting ring 102 which concentrically surrounds the optical axis of the camera objective is to be adjusted by a diaphragm-adjusting motor 101 arranged in the lower portion of the camera casing 1. The adjustment of the ring 102 is effected by a gearing consisting of a worm 103 mounted on the motor shaft 104 of the diaphragm-adjusting motor 101, a worm gear 105 mounted on the lower end of a vertical shaft 106, a worm 107 mounted on the upper end of the vertical shaft 106, a worm gear 108 mounted on a horizontal bearing pin 109 and meshing with the worm 107 and, also mounted on the same bearing pin 109 is a pinion 113 frictionally connected to the worm wheel 108 by means of a friction disk 110, a spring 111 and a locking washer 112 (FIG. 2). In place of the worm gears, as is frequently the case, may also be used helical gears.

The lower end of the shaft 106 is supported by a bearing 114, which, in turn, is supported by the motor shaft 104 and at its upper end by two horizontal forks 115 and 116 on a vertically slidable shutter-release plate 117. A spring 118 urges the worm 107 in steady engagement with the worm gear 108 and is attached with one end to a slidable ring 119 mounted on the shaft 106. The other end of the spring 118 is secured to a pin 120 in the camera casing.

The horizontal bearing pin 109 with the worm gear 108 and the pinion 113 thereon is carried by an adjustment ring 121 which is arranged coaxially to the diaphragm-adjusting ring 102 on a portion of the camera objective mount 2. This adjustment ring 121 has a radially projecting indicator arm 122 provided with a handle 123. Opposite the indicator on the indicator arm 122 are arranged fixed marks 124 and 125 which designate different picture frequencies, for instance, 16 picture frames per second and 48 p./s., respectively. The shutter release plate 117 is vertically slidably guided in the direction of a double arrow 126 by a prism-like casing projection 127 which engages a recess 128 in the rear face of the shuter release plate 117. A headed screw 130 extending through an oblong slot 129 of the plate 117 insures a straight-line movement of the shutter plate 117. The shutter plate 117 is also provided with a laterally extending operating handle 131 which projects through a vertical slot 132 in the camera casing wall.

Associated with the two extreme positions of the vertically slidable shutter plate 117 are vertically spaced switches 133 and 134 which are capable of being closed by the upper and lower ends respectively, of the shutter plate 117 in its respective extreme positions. These switches 133 and 134 are each arranged in an electric circuit for the signal lamp 135 supplied with current by a battery 136. The electric circuit containing the switch 133 further includes two pairs of contacts 137, 138 and 139, 140, each pair of which may be electrically connected with each other by means of a contact member 141 arranged on the circumference of the diaphragm-adjusting ring 102. Correspondingly positioned with respect to the supply circuit containing the switch 134 are the pairs of contacts 138, 142 and 140, 143. These contacts 137, 138, 142, 139, 140, 143 are arranged in the order named circumferentially spaced from each other on a circle which concentrically surrounds the diaphragm-adjusting ring 102. The range of rotation of the diaphragm-adjusting ring 102 is limited by the stops 144 and 145, when the contact member 141 or its carrier, respectively, strikes against these stop pins 144 and 145.

During picture-taking in the normal case, the automatic exposure control device adjusts by means of the diaphragm-adjusting motor 101 the correct diaphragm aperture as determined for the given conditions. Changing the frame frequency from 16 pictures per second, as illustrated in FIG. 1, to 48 frames per second, causes the worm gear 108 to be displaced along with the adjusting ring 121 from the illustrated position to the position in which the indicator arm 122 registers with the mark 125. During this displacement, the worm gear 108 rolls along the stationary or rotating worm 107 and rotates the diaphragm-adjusting ring 102 an amount which corresponds to the change of exposure time, so that upon completion of the change from normal to slow motion, the correct diaphragm aperture value has again been immediately adjusted. Irrespective of this readjustment, due to the change in film speed from 16 frames/second to 48 frames/sec., the exposure control device keeps on working. The same holds true obviously also for the reverse operation of changing from 48 frames/sec. to 16 frames/sec.

If it is desired to adjust the diaphragm manually, for instance, to obtain artistic effects, then the friction between one end face of the pinion 113 and the adjacent end face of the worm gear 108 must be overcome, since the worm gear 108 is locked by the worm 107 during the reverse flow of energy. In order to prevent an unintentional adjustment of the worm gear 108 during the manual setting of the diaphragm, a locking of the speed selector in the positions associated with its different speeds is helpful.

In a similar manner as the change from 16 frames/sec. to 48 frames/sec. and back again by means of the handle 123 on the indicator arm 122 on the adjusting ring 121, the change from stopping to running the camera is effected by means of the shutter plate 117. To release the camera and start it running, the handle 131 on the shutter plate 117 is pushed downward; thereby the shutter release plate 117 is moved downward, taking along the worm 107 by means of the forks 115 and 116. The worm 107 rotated by the diaphragm-adjusting motor 101 serves hereby as a driving rack for the worm gear 108 which is being rotated and, in turn, rotates the diaphragm-adjusting ring 102, which meshes with the worm gear 108, in the direction of opening up of the diaphragm. The magnitude of this adjustment movement is such that the difference between the diaphragm aperture values for a mobile and an immobile picture window shuter in the stopped or the moving condition of the camera, respectively, i.e. either continuous light or impulse light impinging upon the photoelectric converter, is compensated for.

In the position of the diaphragm-adjusting ring 102 shown in FIG. 1, the contact member 141 connects the contacts 137 and 138 and causes the signal lamp 135 to light up. Accordingly, the diaphragm aperture adjustment has reached a value which corresponds to the value of the largest diaphragm aperture possible for operating the camera at a normal speed of 16 picture frames per second. By the same token, the signal lamp 135 would also light up if the shutter release plate 117 were pushed downward, thus opening the upper switch 133 and closing the lower switch 134. The contact member 141 would then connect the contacts 138 and 142. With the shutter release plate 117 in its rest position (FIG. 1), the signal lamp 135 would also light up if the diaphragm-adjusting ring 102 were rotated clockwise for such a distance that the contact member 141 on the diaphragm-adjusting ring 102 would connect the two contacts 139 and 140. With the camera running, i.e. with the switch 134 closed, the signal lamp 135 lights up already when the contact member 141 connects the contacts 140 and 143. This possibility of signalling tolerates the loss of one diaphragm aperture value at the end of the adjustment motion of the diaphragm adjusting ring 102 toward the smallest diaphragm aperture.

If one would forego the premature establishing of contact for the signal lamp 135 in the operative position of the camera release means and would also include the contacts 139 and 140 in the same manner as the contacts 138 and 142 in the electric circuit with the switch 134, then upon release of the camera-release means, the friction clutch between the worm gear 108 and the pinion 113 will have to slip. This operation is as follows:

In the lower position of the camera release means 131, the worm 107 will also be in its lower position, and the diaphragm-adjusting ring 102 can no longer be rotated clockwise because the contact member 141 engages the stop pin 145. Accordingly, the pinion 113 is locked against counterclockwise rotation. If now the release means 131 is released by the camera operator, it will be pulled upwardly by a spring, not illustrated, and the friction disc 110 between the pinion 113 and the worm gear 108 permits a relative slipping movement between these parts 113 and 108, and the worm 107 moves upwardly with the release means 131, thereby causing a counterclockwise rotation of the worm gear 108.

What we claim is:

1. In a motion picture camera provided with a photoelectric exposure control device cooperating with the picture window shutter of said camera and with a picture frequency selector adjustable during the operation of the camera, said exposure control device including a photoelectrically controlled diaphragm-adjusting motor, a diaphragm-adjusting member and gear means operatively connecting said motor with said diaphragm-adjusting member, a camera release member movable in one direction for starting the camera to run and movable in the reverse direction for causing the running camera to stop, means operatively connecting said camera release member with said diaphragm-adjusting member for moving the latter from a position in which said exposure control device is effected by a continuous illumination when the camera is stopped to a position in which during the running of the camera said exposure control device is subjected to intermittent illumination when the camera is running, said picture frequency selector being operatively connected with said gear means which latter adjusts the diaphragm-adjustment member to a position corresponding to the selected picture frequency.

2. A motion picture camera according to claim 1, in which said gear means is constructed to permit said camera release means to operate at the various adjusted picture frequencies.

3. A motion picture camera according to claim 1, including means for indicating the exposure setting and in which the diaphragm-adjusting member is connected with said camera release means for effecting a relative displacement which compensates for the difference in diaphragm values between the running camera and the stopped picture window shutter.

4. A motion picture camera according to claim 1, including means for indicating the exposure setting and in which a member cooperating with the diaphragm-adjusting member is connected with said camera release means for effecting a relative displacement which compensates for the difference in diaphragm values between the running camera and the stopped picture window shutter.

5. A motion picture camera according to claim 1, including two contacts on said camera release member of which one closes an electric circuit when the camera is stopped and the other closes the same circuit when the camera is running so as to cause a signal in said circuit to appear in the viewfinder when the camera is adjusted for a correct exposure.

6. A motion picture camera according to claim 1, including means for indicating the adjustment range limits, and a contact member movable together with the diaphragm-adjustment member and associated with two pairs of spaced terminal contacts, of which for the purpose of indicating said adjustment range limits, one pair of said contacts is included in a signal circuit in the stopped position of said camera release member and the other pair of said contacts is included in a signal circuit in the running position of said camera release member, whereby the distance between said two contact pairs corresponds to the displacement of said contact member together with an adjustment of a diaphragm-adjusting member which equals the difference in the diaphragm aperture values between the diaphragm adjustments for a running and a stopped picture window shutter.

7. A motion picture camera according to claim 6, in which only the adjustment limit signal associated with the largest diaphragm aperture possible for the stopped picture window shutter is moved toward the smaller diaphragm aperture by an amount which equals the difference between said two diaphragm aperture values, i.e. a diaphragm aperture of 1.

8. A motion picture camera according to claim 6, in which said contact member movable together with the diaphragm-adjustment is so arranged on the diaphragm-adjusting member that upon setting the diaphragm to the smallest possible aperture it is able to perform an overstroke amounting to at least the difference in the diaphragm aperture values between the diaphragm adjustments for a moving and a stopped picture window shutter, and thereby leaving the diaphragm aperture unchanged.

9. A motion picture camera according to claim 1, in which the diaphragm-adjusting member comprises the adjusting ring of an iris diaphragm said ring being constructed so as to form a contact member, while the control slots in the diaphragm leaves are so formed at their ends forming the smallest diaphragm aperture that by means of an intermediate part which compensates for the difference in the diaphragm aperture values between the diaphragm adjustments of a moving and a stopped picture window shutter, they are arranged concentrically to the axis of rotation of said adjusting ring.

References Cited

UNITED STATES PATENTS

| | | | |
|---|---|---|---|
| 2,996,965 | 8/1961 | La Rue et al. | 352—141 XR |
| 3,128,669 | 4/1964 | Steisselinger | 352—141 |
| 3,261,653 | 7/1966 | Reinsch | 352—141 |
| 3,419,326 | 12/1968 | Borner | 352—141 |

NORTON ANSHER, Primary Examiner

J. F. PETERS, JR., Assistant Examiner

U.S. Cl. X.R.

352—91, 180